US012720189B2

United States Patent
(12) Nihei et al.

(10) Patent No.: US 12,720,189 B2
(45) Date of Patent: Aug. 25, 2026

(54) INFORMATION PROCESSING SYSTEM, INFORMATION PROCESSING METHOD, AND INFORMATION PROCESSING APPARATUS

(71) Applicant: NEC Corporation, Tokyo (JP)

(72) Inventors: Koichi Nihei, Tokyo (JP); Yoshifumi Onishi, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 241 days.

(21) Appl. No.: 18/579,991

(22) PCT Filed: Sep. 30, 2021

(86) PCT No.: PCT/JP2021/036236
§ 371 (c)(1),
(2) Date: Jan. 17, 2024

(87) PCT Pub. No.: WO2023/053382
PCT Pub. Date: Apr. 6, 2023

(65) Prior Publication Data
US 2025/0008211 A1 Jan. 2, 2025

(51) Int. Cl.
*H04N 19/154* (2014.01)
*H04N 7/14* (2006.01)
(Continued)

(52) U.S. Cl.
CPC ............ *H04N 23/64* (2023.01); *H04N 7/142* (2013.01); *H04N 7/15* (2013.01); *H04N 7/157* (2013.01);
(Continued)

(58) Field of Classification Search
None
See application file for complete search history.

(56) References Cited

U.S. PATENT DOCUMENTS

2013/0208180 A1* 8/2013 Gupta .................... H04N 23/56 348/370
2015/0181168 A1* 6/2015 Pahalawatta ......... H04N 19/124 348/14.12
(Continued)

FOREIGN PATENT DOCUMENTS

JP 2010252276 A * 11/2010
JP 2012-003447 A 1/2012
(Continued)

OTHER PUBLICATIONS

Kameyama Sukekazu, Apparatus and Method for processing image, and program, Nov. 4, 2010, English Translations of JP2010252276A (Year: 2010).*
(Continued)

*Primary Examiner* — Quoc D Tran
(74) *Attorney, Agent, or Firm* — Sughrue Mion, PLLC

(57) ABSTRACT

An information processing system (1) includes: specifying means (12) for specifying, in accordance with an image-capture situation when an image is captured by an image-capturing apparatus (20) and an item of analysis with regard to the image distributed via a network, a first image quality of an area of a specific part in the image used for the analysis; and control means (13) for performing control for distributing the image by setting the image quality of the area of the specific part in the image to the first image quality.

20 Claims, 12 Drawing Sheets

(51) Int. Cl.

| | |
|---|---|
| ***H04N 7/15*** | (2006.01) |
| ***H04N 23/60*** | (2023.01) |
| *G06T 7/00* | (2017.01) |
| *H04N 23/611* | (2023.01) |

(52) U.S. Cl.
CPC .......... *H04N 19/154* (2014.11); *G06T 7/0012* (2013.01); *G06T 2207/30168* (2013.01); *G06T 2207/30201* (2013.01); *H04N 23/611* (2023.01)

(56) References Cited

U.S. PATENT DOCUMENTS

| | | | | |
|---|---|---|---|---|
| 2019/0191129 | A1* | 6/2019 | Nakano | H04N 23/667 |
| 2020/0288996 | A1* | 9/2020 | Yoshizawa | A61B 5/7278 |
| 2021/0019345 | A1* | 1/2021 | Kim | G06F 16/5854 |
| 2024/0054786 | A1* | 2/2024 | Andresen | H04N 7/147 |

FOREIGN PATENT DOCUMENTS

| | | | |
|---|---|---|---|
| JP | 2019-097757 | A | 6/2019 |
| JP | 2019-110433 | A | 7/2019 |

OTHER PUBLICATIONS

International Search Report for PCT Application No. PCT/JP2021/036236, mailed on Dec. 14, 2021.

* cited by examiner

601

| ANALYSIS TARGET | SPECIFIC PART USED FOR ANALYSIS |
|---|---|
| HEART RATE | FACE (CHEEK) |
| RESPIRATORY RATE | UPPER BODY (SHOULDER) |
| BLOOD PRESSURE | FACE |
| ... | ... |

| ANALYSIS TARGET | IMAGE-CAPTURE SITUATION | IMAGE QUALITY |
| --- | --- | --- |
| HEART RATE | IMAGE-CAPTURE SITUATION A1 | IMAGE QUALITY A1 |
| | IMAGE-CAPTURE SITUATION A2 | IMAGE QUALITY A2 |
| | … | … |
| RESPIRATORY RATE | … | … |
| … | … | … |

| ANALYSIS TARGET | IMAGE-CAPTURE SITUATION | IMAGE QUALITY | RELIABILITY |
|---|---|---|---|
| HEART RATE | IMAGE-CAPTURE SITUATION A1 | IMAGE QUALITY A11 | RELIABILITY A11 |
| | | IMAGE QUALITY A12 | RELIABILITY A12 |
| | | ... | ... |
| | IMAGE-CAPTURE SITUATION A2 | ... | ... |
| | ... | ... | ... |
| RESPIRATORY RATE | ... | ... | ... |
| ... | ... | ... | ... |

Fig. 8

INFORMATION PROCESSING SYSTEM, INFORMATION PROCESSING METHOD, AND INFORMATION PROCESSING APPARATUS

This application is a National Stage Entry of PCT/JP2021/036236 filed on Sep. 30, 2021, the contents of all of which are incorporated herein by reference, in their entirety.

TECHNICAL FIELD

The present disclosure relates to an information processing system, an information processing method, and an information processing apparatus.

BACKGROUND ART

Techniques for performing various kinds of analysis (medical examination, diagnosis, or testing) based on an image such as a still image or a moving image (a video image) have been known. With regard to this technique, Patent Literature 1 discloses a technique for easily measuring a fluctuation in a blood pressure of a subject based on a video image signal obtained by photographing a predetermined part of the subject.

CITATION LIST

Patent Literature

[Patent Literature 1] Japanese Unexamined Patent Application Publication No. 2019-097757

SUMMARY OF INVENTION

Technical Problem

However, in Patent Literature 1, actions to be taken to perform an analysis based on a video image coded for distribution or the like have not been studied. Therefore, according to the technique disclosed in Cited Literature 1, for example, there may be a case where an analysis based on an image (including both a still image and a moving image (a video image)) distributed via a network cannot be appropriately performed.

In view of the aforementioned problem, an object of the present disclosure is to provide a technique for appropriately performing an analysis based on an image distributed via a network.

Solution to Problem

In a first aspect according to the present disclosure, an information processing system includes: specifying means for specifying, in accordance with an image-capture situation when an image is captured by an image-capturing apparatus and an item of analysis with regard to the image distributed via a network, a first image quality of an area of a specific part in the image used for the analysis; and control means for performing control for distributing the image by setting the image quality of the area of the specific part in the image to the first image quality.

Further, in a second aspect according to the present disclosure, an information processing method executing: processing for specifying, in accordance with an image-capture situation when an image is captured by an image-capturing apparatus and an item of analysis with regard to the image distributed via a network, a first image quality of an area of a specific part in the image used for the analysis; and processing for performing control for distributing the image by setting the image quality of the area of the specific part in the image to the first image quality is provided.

Further, in a third aspect according to the present disclosure, an information processing apparatus includes: specifying means for specifying, in accordance with an image-capture situation when an image is captured by an image-capturing apparatus and an item of analysis with regard to the image distributed via a network, a first image quality of an area of a specific part in the image used for the analysis; and control means for performing control for distributing the image by setting the image quality of the area of the specific part in the image to the first image quality.

Advantageous Effects of Invention

According to one aspect, it is possible to appropriately perform an analysis based on an image distributed via a network.

BRIEF DESCRIPTION OF DRAWINGS

FIG. 6 is a diagram showing one example of a specific part DB according to the example embodiment;

FIG. 7 is a diagram showing one example of an image quality setting DB according to the example embodiment;

FIG. 8 is a diagram showing one example of an analysis result history DB according to the example embodiment;

EXAMPLE EMBODIMENT

Principles of the present disclosure are described with reference to several example embodiments. It should be understood that these example embodiments are set forth for purposes of illustration only and that those skilled in the art will assist in understanding and practicing the present disclosure without suggesting limitations on the scope of the present disclosure. The disclosure described herein may be implemented in various methods other than those described below.

In the following description and claims, unless otherwise defined, all technical and scientific terms used herein have the same meaning as commonly understood by one of those skilled in the art of technology to which the present disclosure belongs.

Hereinafter, example embodiments of the present disclosure will be described with reference to the drawings.

First Example Embodiment

<Configuration>

Figure 1A:
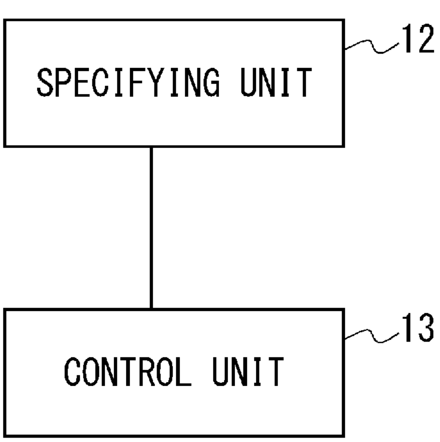
FIG. 1A is a diagram showing one example of a configuration of an information processing system according to an example embodiment.

Referring to FIG. 1A, a configuration of an information processing system 1 according to an example embodiment will be described. FIG. 1A is a diagram showing one example of the configuration of the information processing system 1 according to the example embodiment. The information processing system 1 includes a specifying unit 12 and a control unit 13.

The specifying unit 12 may specify (determine or estimate), for example, based on an image or the like coded and distributed via a network N, an image-capture situation when this image is captured by an image-capturing apparatus 20. The image-capture situation may be specified (determined or estimated) by another function unit of the image-capturing apparatus 20. Alternatively, this specification may be executed by an external apparatus such as a cloud or a server. In this case, the specifying unit 12 may transmit the image to the external apparatus and acquire the results of the specification in the external apparatus from the external apparatus. Note that the image-capture situation means, for example, a state (situation) of a subject, a situation near the subject, or a situation of the image-capturing apparatus 20 when the subject is photographed. The state of the subject may include, for example, a distance (m) from the image-capturing apparatus 20 to the subject, the orientation of the subject relative to the image-capturing apparatus 20, and a size of a specific part used for an analysis (the number of pixels included in the area of the specific part). Further, the situation near the subject may include, for example, brightness or the like of the environment near the subject. Further, the situation of the image-capturing apparatus 20 may include, for example, performance of the image-capturing apparatus 20.

Further, the specifying unit 12 specifies, for example, an image quality of the area of the specific part used to analyze an item to be analyzed in the image (hereinafter also referred to as an "analysis target"). In this case, the specifying unit 12 may determine the image quality in accordance with, for example, the image-capture situation when the image is captured by the image-capturing apparatus 20 and the item of analysis in the image distributed via the network N.

Further, the specifying unit 12 may cause, for example, an analysis module or the like provided inside or outside an information processing apparatus 10 to perform an analysis (testing, analyzation, and estimation) based on the area of the specific part of the subject in the image. For example, a heart rate may be analyzed based on the image of the face area of the subject. When this analysis is executed by an external apparatus, the specifying unit 12 may transmit the image to the external apparatus and acquire analysis results in the external apparatus from the external apparatus.

Further, the specifying unit 12 may receive (acquire) various kinds of information from a storage unit inside the information processing apparatus 10 or from an external apparatus. Further, the specifying unit 12 may execute various kinds of processes based on the image captured by the image-capturing apparatus 20 and distributed.

The control unit 13 transmits (outputs) information based on the results of the determination made by the specifying unit 12 to each of processing units inside the information processing apparatus 10, or to an external apparatus. The control unit 13 transmits, for example, information (command) for distributing an image in which the image quality of the area of the specific part is determined by the specifying unit 12. The information processing apparatus 10 may either be an apparatus to which the image captured by the image-capturing apparatus 20 and coded is distributed or an apparatus that has distributed the image captured by the image-capturing apparatus 20 and coded.

Figure 1B:
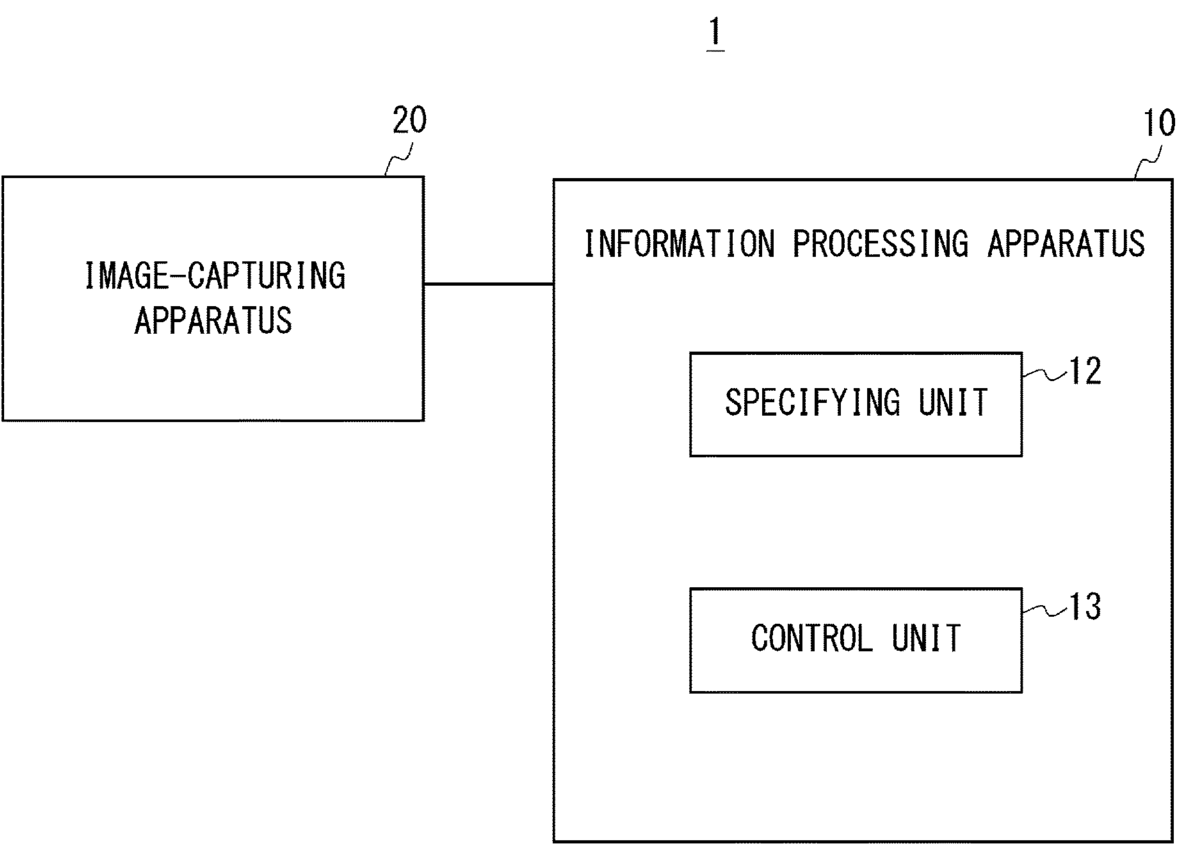
FIG. 1B is a diagram showing one example of a configuration of the information processing system according to the example embodiment.

Further, the specifying unit 12 and the control unit 13 may be aggregated as a single apparatus, as shown in FIG. 1B. In the example shown in FIG. 1B, the information processing system 1 includes the information processing apparatus 10 and the image-capturing apparatus 20. The image-capturing apparatus 20 is an apparatus that photographs a subject, and may be, for example, a camera built into a smartphone, a tablet or the like. Alternatively, the image-capturing apparatus 20 may be, for example, a camera connected to a personal computer or the like by an external bus. The information processing apparatus 10 includes the specifying unit 12 and the control unit 13. These units may be implemented by cooperation of one or more programs installed in the information processing apparatus 10 and hardware such as a processor 101 and a memory 102 of the information processing apparatus 10.

<Processes>

Figure 2:
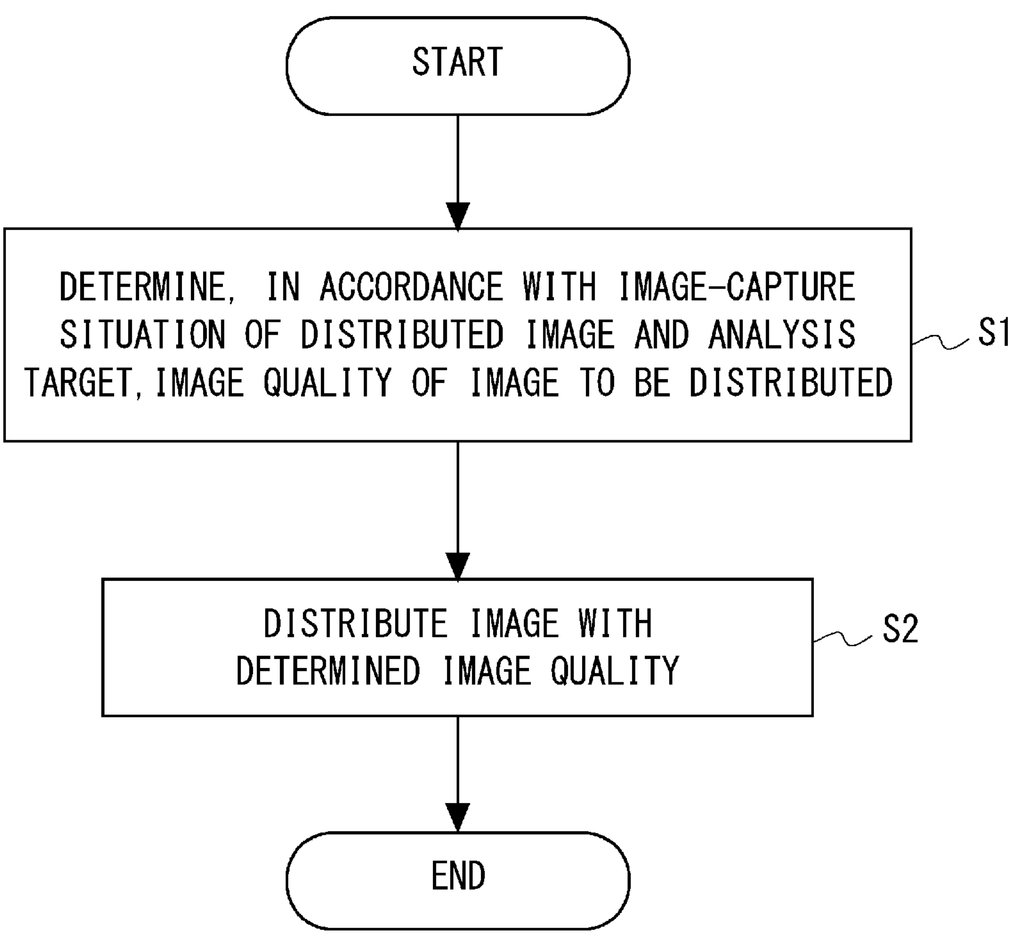
FIG. 2 is a flowchart showing one example of processes of the information processing system according to the example embodiment.

Referring next to FIG. 2, one example of processes in the information processing system 1 according to the example embodiment will be described. FIG. 2 is a flowchart showing one example of the processes in the information processing system 1 according to the example embodiment.

In Step S1, the specifying unit 12 determines, in accordance with an image-capture situation when an image is captured by the image-capturing apparatus 20 and an analysis target analyzed based on an area of a specific part of a subject in the image captured by the image-capturing apparatus 20 and distributed via the network N, an image quality of the area of the specific part in the image captured by the image-capturing apparatus 20. Next, the control unit 13 transmits information for distributing an image in which the image quality in the area of the specific part is the determined image quality (Step S2).

(Process Example when Information Processing Apparatus 10 is Apparatus to which Image is Distributed)

When the information processing apparatus 10 is an apparatus to which an image is distributed, the specifying unit 12 may receive the image via the network N. Then, the specifying unit 12 may determine the image quality in accordance with the image-capture situation and the analysis target. Then, the control unit 13 may transmit, to the apparatus to which the image is distributed, a command for setting (changing) the quality of the image distributed from the apparatus to which the image is distributed to the above image quality.

(Process Example when Information Processing Apparatus 10 is Apparatus that Distributes Image)

When the information processing apparatus 10 is an apparatus that distributes an image, the specifying unit 12 may receive the image from the image-capturing apparatus 20 built into the information processing apparatus 10 via an internal bus. Further, the specifying unit 12 may receive the image from an external (externally attached) image-capturing apparatus 20 connected to the information processing apparatus 10 by a cable or the like via an external bus (e.g., a Universal Serial Bus (USB) cable, a High-Definition Multimedia Interface (HDMI) (registered trademark) cable, or a Serial Digital Interface (SDI) cable). Then the specifying unit 12 may determine the image quality in accordance with the image-capture situation and the analysis target. Then the control unit 13 may transmit, to a module that performs coding processing inside the information processing apparatus 10 or to the image-capturing apparatus 20, a command for setting (changing) the quality of the image distributed from the information processing apparatus 10 to the above image quality.

<Hardware Configuration>

Figure 3:
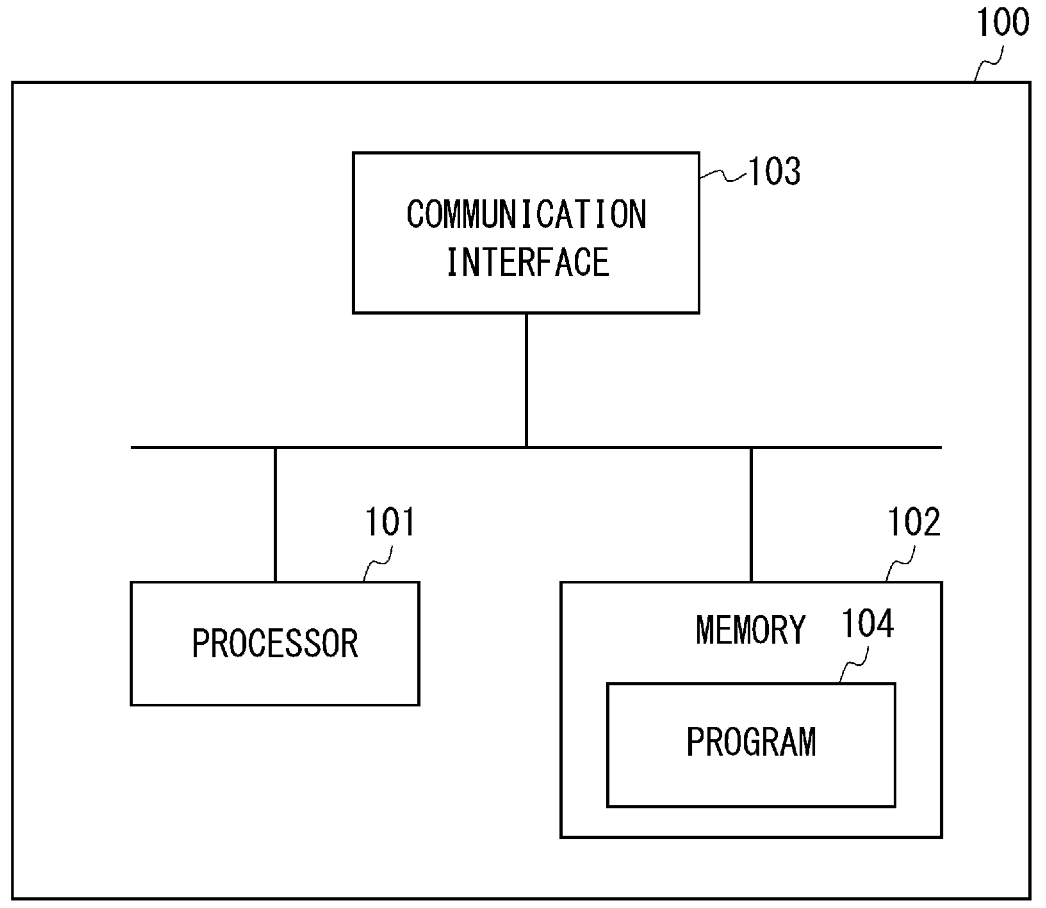
FIG. 3 is a diagram showing an example of a hardware configuration of an information processing apparatus according to the example embodiment.

FIG. 3 is a diagram showing an example of a hardware configuration of the information processing apparatus 10 according to the example embodiment. In the example shown in FIG. 3, the information processing apparatus 10 (a computer 100) includes a processor 101, a memory 102, and a communication interface 103. These units may be connected by a bus or the like. The memory 102 stores at least a part of a program 104. The communication interface 103 includes an interface necessary for communication with other communication functions.

When the program 104 is executed by cooperation of the processor 101, the memory 102, and the like, the computer 100 performs at least a part of processing of the example embodiment of the present disclosure. The memory 102 may be of any type suitable for a local technical network. The memory 102 may be, by way of non-limiting example, a non-transitory computer readable storage medium. Further, the memory 102 may be implemented using any suitable data storage technology, such as semiconductor based memory devices, magnetic memory devices and systems, optical memory devices and systems, fixed memory and removable memory, as non-limiting examples. While only one memory 102 is shown in the computer 100, there may be several physically distinct memory modules in the computer 100. The processor 101 may be of any type. The processor 101 may include one or more of general purpose computers, special purpose computers, microprocessors, digital signal processors (DSPs) and processors based on multicore processor architecture, as non-limiting examples. The computer 100 may have multiple processors, such as an application specific integrated circuit chip that is slaved in time to a clock which synchronizes the main processor.

The example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method according to the present disclosure. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus. The program codes, when executed by the processor or controller, cause the functions/operations specified in the flowcharts and/or block diagrams to be implemented. The program code may be executed entirely on a machine, partly on the machine, as a stand-alone software package, partly on the machine and partly on a remote machine or entirely on the remote machine or server.

The program can be stored and provided to a computer using any type of non-transitory computer readable media. Non-transitory computer readable media include any type of tangible storage media. Examples of non-transitory computer readable media include magnetic storage media, optical magnetic storage media, optical disc media, semiconductor memories, etc. The magnetic storage media include, for example, flexible disks, magnetic tapes, hard disk drives, etc. The optical magnetic storage media include, for example, magneto-optical disks. The optical disc media include, for example, a Blu-ray disc, a Compact Disc (CD)-Read Only Memory (ROM), CD-Recordable (R), CD-ReWritable (RW), etc. The semiconductor memories include, for example, solid state drive, mask ROM, Programmable ROM (PROM), Erasable PROM (EPROM), flash ROM, random access memory (RAM), etc. The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Second Example Embodiment

<System Configuration>

Figure 4:
FIG. 4 is a diagram showing a configuration example of an information processing system according to an example embodiment.
Figure 4:
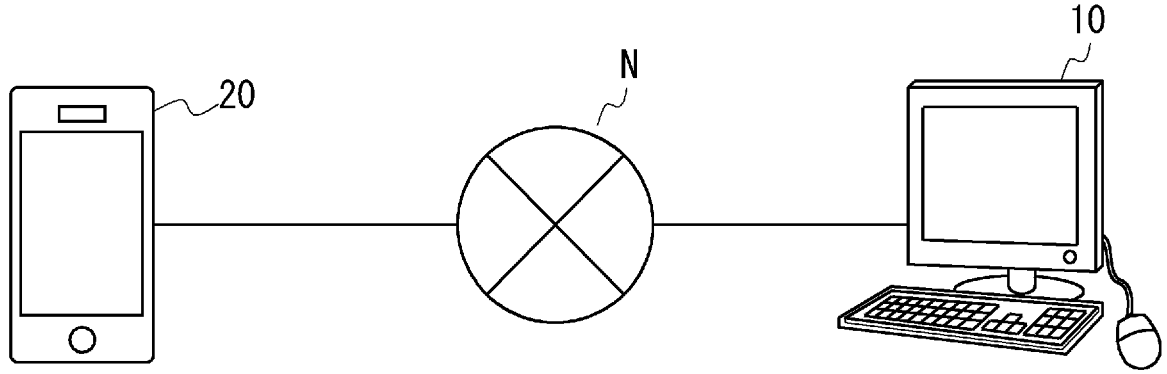

Referring next to FIG. 4, a configuration of an information processing system 1 according to an example embodiment will be described. FIG. 4 is a diagram showing a configuration example of the information processing system 1 according to the example embodiment. In the example shown in FIG. 4, the information processing system 1 includes an image-capturing apparatus 20 and an information processing apparatus 10. Note that the number of image-capturing apparatuses 20 and the number of information processing apparatuses 10 are not limited to those shown in the example in FIG. 4.

Note that the technique according to the present disclosure may be used, for example, for measurement of biological information based on an image of a patient (a human being or an animal) in a video conference (a video call or an online medical examination) between a doctor and the patient. The technique according to the present disclosure may also be used, for example, for analysis (specification) of a person and analysis (estimation) of behavior based on images in a monitoring camera. The technique according to the present disclosure may also be used, for example, for analysis (testing) of a product based on images of a monitoring camera installed in a factory or a plant.

In the example shown in FIG. 4, the image-capturing apparatus 20 and the information processing apparatus 10 are connected to each other in such a way that they can communicate with each other via a network N. The network N includes, for example, the Internet, a mobile communication system, wireless Local Area Network (LAN), LAN, a short-range wireless communication such as Bluetooth (registered trademark) Low Energy (BLE), and the like. The mobile communication system includes, for example, the fifth generation mobile communication system (5G), the fourth generation mobile communication system (4G), the third generation mobile communication system (3G), and the like.

The image-capturing apparatus 20 may be, for example, an apparatus including a smartphone, a tablet, a personal computer or the like. The image-capturing apparatus 20 codes a captured image (including a still image and a moving image (a video image)) by any coding scheme and distributes the coded image to the information processing apparatus 10 via the network N. This coding scheme may include, for example, H.265/High Efficiency Video Coding (HEVC), AO Media Video 1 (AV1), H.264/MPEG-4 Advanced Video Coding (AVC), and the like.

The information processing apparatus 10 may be, for example, an apparatus such as a personal computer, a server, a cloud, a smartphone, or a tablet. The information processing apparatus 10 performs an analysis based on the image distributed from the image-capturing apparatus 20.

<Processes>

Figure 5:
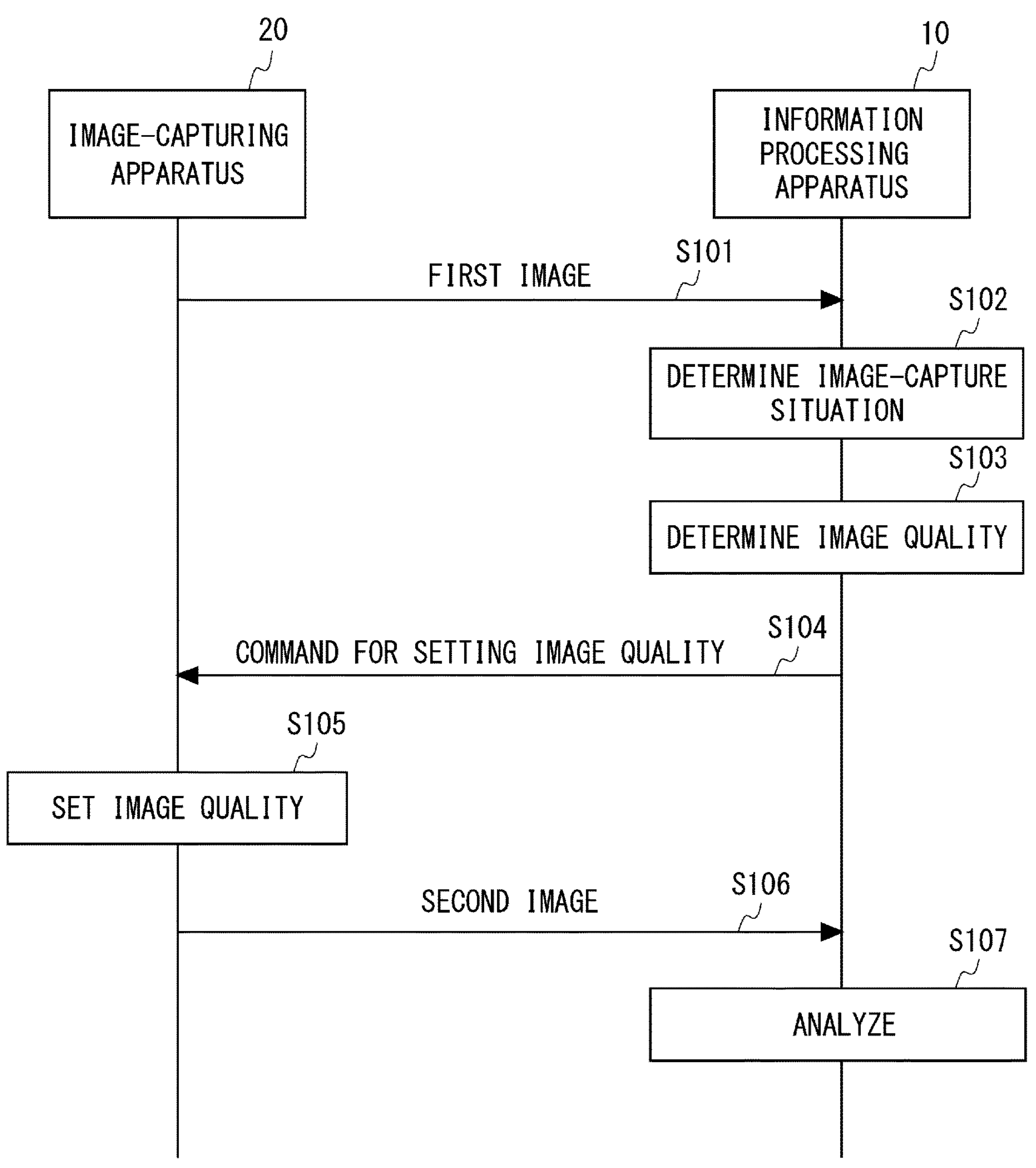
FIG. 5 is a sequence diagram showing one example of processes of the information processing system according to the example embodiment.
Figure 9:
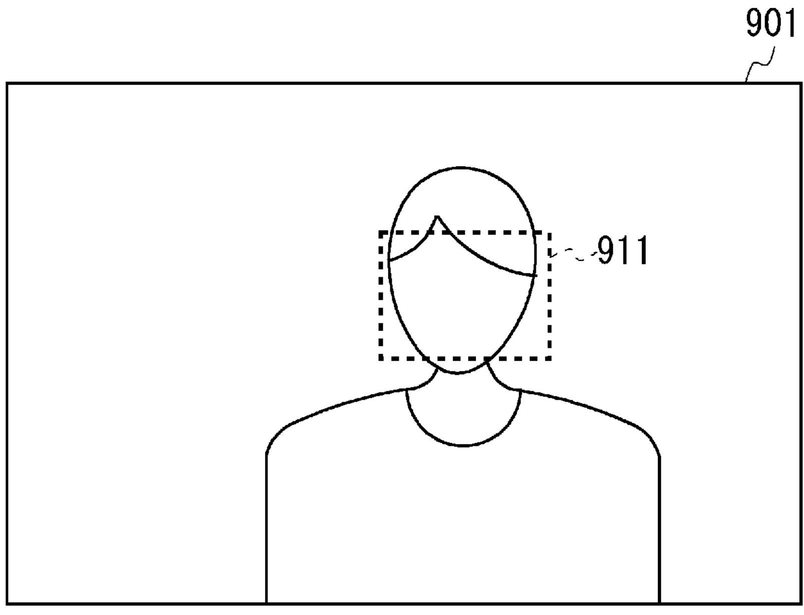
FIG. 9 is a diagram showing one example of an area of a specific part according to the example embodiment.

Referring next to FIGS. 5 to 9, one example of processes of the information processing system 1 according to the example embodiment will be described. FIG. 5 is a sequence diagram showing one example of the processes of the information processing system 1 according to the example embodiment. FIG. 6 is a diagram showing one example of a specific part DB (database) 601 according to the example embodiment. FIG. 7 is a diagram showing one example of an image quality setting DB 701 according to the example embodiment. FIG. 8 is a diagram showing one example of an analysis result history DB 801 according to the example embodiment. FIG. 9 is a diagram showing one example of an area of a specific part according to the example embodiment.

Hereinafter, as one example, a case where biological information based on a patient's image is measured in a video conference (a video call or an online medical examination) between a doctor and the patient will be described. In the following description, it is assumed that a process of establishing a video conference session or the like between the image-capturing apparatus 20 of the patient and the information processing apparatus 10 of the doctor has already been ended.

In Step S101, the image-capturing apparatus 20 distributes (transmits) a first image in which an area of a specific part of a subject in the captured image is coded to the information processing apparatus 10 via the network N. Here, the image-capturing apparatus 20 may distribute a first image whose area of the specific part is coded with a specific image quality and area other than the specific part is coded with an image quality lower than the specific image quality. In other words, the image-capturing apparatus 20 may code the image with the image quality with which the area of the specific part in the captured image is displayed clearly and with the image quality with which the area other than the area of the specific part in the captured image is displayed less clearly than the area of the specific part and distribute the obtained image.

Next, the specifying unit 12 of the information processing apparatus 10 specifies, based on the received first image and the like, the image-capture situation when the first image is captured by the image-capturing apparatus 20 (Step S102). In this step, the specifying unit 12 of the information processing apparatus 10 may specify the image-capture situation by, for example, Artificial Intelligence (AI) that uses deep learning or the like. The image-capture situation may include at least one of a distance (m) from the image-capturing apparatus 20 to the subject, the orientation of the subject relative to the image-capturing apparatus 20, the number of pixels included in the area of the specific part used for the analysis, brightness of the environment near the subject, or performance of the image-capturing apparatus 20. Further, the image-capture situation may further include at least one of a coding scheme (e.g., H.264, H.265, or the like) when the image captured by the image-capturing apparatus 20 is distributed via the network N, or bandwidth that is available in the network N.

The specifying unit 12 of the information processing apparatus 10 may calculate the distance from the image-capturing apparatus 20 to the subject based on, for example, values of a ratio of the number of pixels included in the subject area to the number of pixels in the entire received frame. In this case, the specifying unit 12 of the information processing apparatus 10 may determine, for example, that the distance from the image-capturing apparatus 20 to the subject becomes smaller (closer) as the values of the above ratio become larger. Further, the specifying unit 12 of the information processing apparatus 10 may use, for example, a Depth estimation technique for estimating distances to the respective pixels in the image. Further, the specifying unit 12 of the information processing apparatus 10 may measure the distance by using, for example, a stereo camera or a LiDAR. The orientation of the subject relative to the image-capturing apparatus 20 may be, for example, information indicating how far the front of the subject is displaced from the image-capturing apparatus 20 in the image in at least one of the following directions: up, down, left, or right.

The number of pixels included in the area of the specific part used for the analysis is the number of pixels included in the area of the specific part according to the analysis target analyzed in Step S107. Note that the analysis target may be specified (selected or set) by a doctor or the like in advance. Further, the specifying unit 12 of the information processing apparatus 10 may determine one or more analysis targets based on results of a medical history form filled out by a patient in advance on a predetermined website or the like. The specifying unit 12 of the information processing apparatus 10 may determine the specific part according to the analysis target by referring to, for example, the specific part DB 601. In the example shown in FIG. 6, the specific part of the subject used for the analysis is recorded in the specific part DB 601 in association with the analysis target. Note that the specific part DB 601 may be stored (registered or set) in a storage apparatus inside the information processing apparatus 10 or may be stored in a DB server or the like provided in the outside of the information processing apparatus 10. In the example shown in FIG. 6, it is recorded in the specific part DB 601, for example, that the face (cheek) area in the image is used for the analysis when the analysis target is a heart rate. Then, the specifying unit 12 of the information processing apparatus 10 may detect the area of the specific part in the received image by object recognition or the like, and calculate the number of pixels in the detected area.

The brightness of the environment near the subject means brightness by an ambient light near the subject photographed by the image-capturing apparatus 20, a flashlight of the image-capturing apparatus 20, and the like. The performance of the image-capturing apparatus 20 may include, for example, a focal distance, existence of a high dynamic range (HDR), color depth, resolution of a still image, resolution of a moving image, a maximum frame rate, and the like. Note that the specifying unit 12 of the information processing apparatus 10 may acquire information indicating performance of the image-capturing apparatus 20 from the image-capturing apparatus 20. In this case, the information indicating the performance of the image-capturing apparatus 20 may include, for example, the model name (product name) of the image-capturing apparatus 20, or may include a model name of the image-capturing apparatus 20 when the image-capturing apparatus 20 is built into the image-capturing apparatus 20. In this case, the specifying unit 12 of the information processing apparatus 10 may acquire the value of each performance of the image-capturing apparatus 20 based on the model name using a table or the like in which the model name registered in advance is associated with the value of each performance.

Next, the specifying unit 12 of the information processing apparatus 10 determines a first image quality of the area of the specific part in accordance with the image-capture situation and the analysis target analyzed based on the area of the specific part of the subject (Step S103). Accordingly, for example, it is possible to appropriately determine the image quality with which an analysis based on an image distributed via a network can be appropriately performed. When, for example, the image quality of the area of the specific part in accordance with the image-capture situation and the analysis target is improved, the reliability (accuracy) of the analysis results can be improved. Further, when, for example, the image quality of the area of the specific part in accordance with the image-capture situation and the analysis target is degraded, the bandwidth used by the network N can be reduced. Further, even with an image in which the distance from the image-capturing apparatus 20 to the patient is relatively large, for example, the accuracy of the analysis can be improved. Further, for example, by improving the image quality of only the area of the specific part, it is possible to reduce the increase in the bandwidth used in the distribution.

Note that the specifying unit 12 of the information processing apparatus 10 may extract information on the specific part according to the analysis target by referring to, for example, the specific part DB 601 in FIG. 6. Then, the specifying unit 12 of the information processing apparatus 10 may specify the area of the specific part in the image captured by the image-capturing apparatus 20. Here, the specifying unit 12 of the information processing apparatus 10 may determine, based on the distributed image, a rectangle (square or rectangular) area including a part such as a face by using AI or the like, and may set this rectangle area as the area of the specific part. The information indicating the area of the specific part may include, for example, coordinate positions of pixels in the lower left and the upper right of this area. Further, the information indicating the area of the specific part may include, for example, coordinate positions of one of the upper left, the lower left, the upper right, or the lower right and the size (e.g., the height and the width) of the specific area. Alternatively, the information indicating the area of the specific part may include, for example, information on a map (a QP map) that sets a QP value by a unit of a specific pixel area (e.g., 16 pixels (height)×16 pixels (width)).

Then, the specifying unit 12 of the information processing apparatus 10 may determine information indicating the image quality of the area of the specific part based on the analysis target and the image-capture situation. In this case, the information indicating the image quality of the area of the specific part may include, for example, at least one of a bit rate of coding, a frame rate of coding, or a quantization parameter of coding (QP value).

When hierarchical coding (SVC, Scalable Video Coding) is used as a coding scheme of the image captured by the image-capturing apparatus 20, the specifying unit 12 of the information processing apparatus 10 may determine to consider the entire image as a base layer and the area of the specific part as an enhancement layer. In this case, the information indicating the image quality of the area of the specific part may include a bit rate for each of one or more layers which includes at least the enhancement layer.

Further, the information indicating the image quality of the area of the specific part may include information regarding setting of the image-capturing apparatus 20. The information regarding setting of the image-capturing apparatus 20 may include a setting value regarding adjustment of the image quality of the image output from the image-capturing apparatus 20 and a setting value regarding control of the image-capturing apparatus 20. The setting regarding adjustment of the image quality of the image output from the image-capturing apparatus 20 may include, for example, at least one of bit depth (color depth), brightness, contrast, tone of color, vividness, white balance, backlight correction, and gain of the image output from the image-capturing apparatus 20. Further, the setting regarding control of the image-capturing apparatus 20 may include, for example, at least one of zoom, focus, exposure, or the like.

(Example in which Image Quality is Determined Based on Correspondence Table)

The specifying unit 12 of the information processing apparatus 10 may determine the information indicating the image quality of the area of the specific part by referring to the image quality setting DB 701. In the example shown in FIG. 7, the image quality of the area of the specific part is set in the image quality setting DB 701 in association with a pair of the analysis target and the image-capture situation. The specifying unit 12 of the information processing apparatus 10 may determine the image quality set in accordance with the analysis target and the image-capture situation as the image quality of the area of the specific part by referring to the image quality setting DB 701. Note that the image quality setting DB 701 may be stored (registered or set) in a storage apparatus inside the information processing apparatus 10 or may be stored in a DB server or the like provided in the outside of the information processing apparatus 10.

(Example in which Image Quality is Determined Based on Results of Machine Learning)

The specifying unit 12 of the information processing apparatus 10 may determine information indicating the image quality of the area of the specific part based on results of machine learning. In this case, the specifying unit 12 of the information processing apparatus 10 may generate a learned model in advance by using the data recorded in the analysis result history DB 801 as training data. Note that the analysis result history DB 801 may be stored (registered or set) in a storage apparatus inside the information processing apparatus 10 or may be stored in a DB server or the like provided in the outside of the information processing apparatus 10.

In the example shown in FIG. 8, a data set in which reliability is registered in association with the set of the analysis target, the image-capture situation, and the image quality of the area of the specific part is recorded in the analysis result history DB 801. The reliability means reliability (accuracy) of the analysis results regarding the corresponding analysis target in the corresponding image-capture situation and with the corresponding image quality. The reliability of the analysis results may be, for example, a value indicating how accurate the values of the analysis results are for the set of one analysis target, the image-capture situation, and the image quality of the area of the specific part. The reliability of the analysis results may be, for example, a deviation (e.g., a value of variance) between a value estimated by an analysis module or the like and a ground truth value. Note that the ground truth value may be, for example, a value measured by a doctor or the like who sees a patient or the like. Further, the ground truth value may be, for example, a value directly measured by a patient or the like using a special instrument for measurement. Further, the ground truth value may be, for example, a value inferred by an analysis module or the like based on an image whose data size is not compressed. The specifying unit 12 of the information processing apparatus 10 may perform supervised learning of a regression problem in which the analysis target, the image-capture situation, and the image quality recorded in the analysis result history DB 801 are set as explanatory variables (input variables or independent variables) and the reliability is set as target variables (ground truth label, response variables, or dependent variables). In this case, the specifying unit 12 of the information processing apparatus 10 may perform machine learning using, for example, a neural network (NN) or Random Forest. Note that the processing for generating a learned model (learning phase) may be executed by an external device such as a cloud or the like.

Then, the specifying unit 12 of the information processing apparatus 10 may estimate (infer), for each of a plurality of image qualities of the area of the specific part, reliability of the determined set of the image-capture situation and the analysis target. In this case, the specifying unit 12 of the information processing apparatus 10 may calculate the value of reliability by inputting the information on the analysis target, the image-capture situation, and the image quality into the learned model.

Then, the specifying unit 12 of the information processing apparatus 10 may determine, of one or more image qualities whose estimated reliability levels are equal to or larger than a threshold, the image quality of the area of the specific part to be instructed to the image-capturing apparatus 20 based on the communication amount (a data size or a bit rate) when an image is distributed with each image quality and the reliability in each image quality. In this case, the specifying unit 12 of the information processing apparatus 10 may set, for example, the priority (score) determined as the image quality of the area of the specific part to be higher as the communication amount of each image quality decreases and the reliability increases. Then, the specifying unit 12 of the information processing apparatus 10 may determine the image quality whose determined priority is the highest as the image quality of the area of the specific part to be instructed to the image-capturing apparatus 20. Accordingly, it is possible to select, for example, an optimal image quality where the communication amount is relatively small and the reliability is relatively high, considering the tradeoff between the communication amount and the reliability.

(Example in which Increase in Communication Amount of Image is Reduced)

The specifying unit 12 of the information processing apparatus 10 may improve the image quality of an area of a specific part (e.g., patient's face) and degrade the image quality of the part other than the specific part. Accordingly, for example, it is possible to reduce the increase in the communication amount of the image. In this case, the specifying unit 12 of the information processing apparatus 10 may determine, for example, the quality of the area of the specific part as the first image quality and determine the image quality of the area other than the specific part as the second image quality lower than the first image quality. Then, the specifying unit 12 of the information processing apparatus 10 may transmit information for distributing an image in which the image quality of the area of the specific part is the first image quality and the image quality of the area other than the specific part is the second image quality to the image-capturing apparatus 20.

(Example in which Image Quality is Determined Based on Predicted Value of Bandwidth)

The specifying unit 12 of the information processing apparatus 10 may determine at least one of the first image quality or the second image quality based on a communication environment (e.g., a fluctuation of available bandwidth) of a network N in which the image captured by the image-capturing apparatus 20 is distributed. Accordingly, the image quality may be degraded when there is no sufficient margin for available bandwidth, whereby disturbance of a video image can be reduced. Further, the specifying unit 12 of the information processing apparatus 10 may determine at least one of the first image quality or the second image quality based on the predicted value of the available bandwidth. Accordingly, disturbance of a video image from the reduction in the bandwidth to the degradation of the image quality can be further reduced as compared to the case where, for example, the image quality is degraded after the bandwidth is reduced. Further, when, for example, it is expected that there is no margin for available bandwidth if only the image quality of the face area is improved, it is possible to improve the image quality of the face area and degrade the image quality of the area other than the face area.

Note that the specifying unit 12 of the information processing apparatus 10 may perform machine learning of communication log information when an image was transmitted via the network N in the past, radio quality information such as a radio wave strength, a day of the week or a time, and a relation between weather and available bandwidth in advance, and calculate available bandwidth or a predicted bandwidth value.

Next, the control unit 13 of the information processing apparatus 10 transmits information (command) for distributing the second image in which the image quality of the area of the specific part is the first image quality to the image-capturing apparatus 20 (Step S104). This command may include, for example, information indicating the area of the specific part and information indicating the image quality of the area of the specific part. Note that the second image may be the same as the first image or may be different from the first image. When, for example, images are distributed in real time, the first image is an image captured in the process in Step S101 and the second image is an image captured at a timing later than the timing when the process in Step S104 is performed.

Next, the image-capturing apparatus 20 sets (changes) the image quality of the area of the specific part of the subject in the captured image to the first image quality based on the received command (Step S105). Next, the image-capturing apparatus 20 distributes (transmits) a second image whose area of the specific part of the subject in the captured image is coded with the first image quality to the information processing apparatus 10 via the network N (Step S106). In the example shown in FIG. 9, a face area 911 of the patient in a captured image 901 is coded with the first image quality specified by the information processing apparatus 10. Further, the area other than the face area 911 in the image 901 may be coded with an image quality lower than the first image quality.

Next, the specifying unit 12 of the information processing apparatus 10 analyzes the subject based on the area of the specific part of the subject with the first image quality in the received second image (Step S107). In this step, the specifying unit 12 of the information processing apparatus 10 may measure (calculate, infer, or estimate), for example, various kinds of information on the analysis target of the subject by Artificial Intelligence (AI) that uses deep learning or the like. The analysis target may include, for example, at least one of a heart rate, a respiratory rate, blood pressure, swelling, transcutaneous arterial blood oxygen saturation, a pupil size, throat swelling, or a degree of periodontal disease.

The specifying unit 12 of the information processing apparatus 10 may measure a heart rate based on a video image of an area where the patient's skin is exposed (e.g., face area). In this case, the specifying unit 12 of the information processing apparatus 10 may measure the heart rate based on, for example, transition (period) of changes in the skin color.

Further, the specifying unit 12 of the information processing apparatus 10 may measure a respiratory rate based on a video image of an area of the patient's chest (upper body). In this case, the specifying unit 12 of the information processing apparatus 10 may measure the respiratory rate based on, for example, a cycle of shoulder movements.

Further, the specifying unit 12 of the information processing apparatus 10 may measure blood pressure based on the video image of the area where the patient's skin is exposed (e.g., face area). In this case, the specifying unit 12 of the information processing apparatus 10 may estimate the blood pressure based on, for example, the difference between pulse waves estimated from two parts of the face (e.g., forehead and cheeks) and the shapes of these pulse waves.

Further, the specifying unit 12 of the information processing apparatus 10 may measure transcutaneous arterial blood oxygen saturation (SpO2) based on the video image of the area where the patient's skin is exposed (e.g., face area). Note that red is easily transmitted when hemoglobin is bonded to oxygen, while blue is insusceptible to the binding of hemoglobin to oxygen. Therefore, the specifying unit 12 of the information processing apparatus 10 may measure SpO2 based on, for example, the difference in the degree of change in the blue color and red color of the skin near the cheekbones under the eyes.

Further, the specifying unit 12 of the information processing apparatus 10 may measure, for example, a degree of swelling based on an image of the patient's eyelid area. Further, the specifying unit 12 of the information processing apparatus 10 may measure, for example, a pupil size (pupil diameter) based on an image of the patient's eye area. Further, the specifying unit 12 of the information processing apparatus 10 may measure, for example, throat swelling, a degree of periodontal disease, or the like based on an image of the patient's mouth area.

The specifying unit 12 of the information processing apparatus 10 may cause a display device to display patient's biological information (vital sign), which corresponds to the analysis results. Note that the specifying unit 12 of the information processing apparatus 10 may continuously perform an analysis and display the analysis results in real time.

Further, when the image quality specified by the received command is not supported in the process of Step S105, the image-capturing apparatus 20 may send a response indicating this information back to the information processing apparatus 10. In this case, the specifying unit 12 of the information processing apparatus 10 may cause a message indicating that the analysis has been failed to be displayed. According to this configuration, the doctor can instruct, for example, the patient to approach the image-capturing apparatus 20 by voice or other means over the phone.

(Example in which Person is Specified by Using Image of Image-Capturing Apparatus 20, which is Monitoring Camera)

In the aforementioned example, the example of measuring biological information in a video conference between a doctor and a patient has been described. In the following description, an example in which a person is specified by using an image of the image-capturing apparatus 20, which is a monitoring camera, will be described. In this case, a video image of the image-capturing apparatus 20 may be distributed from the image-capturing apparatus 20 to the information processing apparatus 10.

First, when the area of the person is detected based on the image of the image-capturing apparatus 20, the specifying unit 12 of the information processing apparatus 10 may improve the image quality of the entire image in such a way that reliability of the detection of the area of the person becomes equal to or larger than a threshold based on the image-capture situation when the image is captured by the image-capturing apparatus 20. Further, when the person is specified based on the image of the image-capturing apparatus 20, the specifying unit 12 of the information processing apparatus 10 may improve the image quality of the face area of the person in such a way that specific reliability of the person becomes equal to or larger than a threshold based on the image-capture situation when the image is captured by the image-capturing apparatus 20. Further, when person's behavior is specified based on the image of the image-capturing apparatus 20, the specifying unit 12 of the information processing apparatus 10 may improve the image quality of the area of the whole body of the person in such a way that specific reliability of a behavior becomes equal to or larger than a threshold based on the image-capture situation when the image is captured by the image-capturing apparatus 20.

(Example in which Product is Tested (Inspected) by Image of Image-Capturing Apparatus 20)

In the following description, an example in which a product is tested (inspected) by an image of an image-capturing apparatus 20, which is a monitoring camera, will be described. In this case, a video image of the image-capturing apparatus 20 may be distributed from the image-capturing apparatus 20 to the information processing apparatus 10.

First, when the area of the product is detected based on the image of the image-capturing apparatus 20, the specifying unit 12 of the information processing apparatus 10 may improve the image quality of the entire image in such a way that the reliability of the detection of the area becomes equal to or larger than a threshold based on the image-capture situation when the image is captured by the image-capturing apparatus 20. Further, when the product is tested based on the image of the image-capturing apparatus 20, the specifying unit 12 of the information processing apparatus 10 may improve the image quality of the area of the product in such a way that the reliability of the testing becomes equal to or larger than a threshold based on the image-capture situation when the image is captured by the image-capturing apparatus 20.

(Example in which Facility is Checked by Using Image of Image-Capturing Apparatus 20)

In the following description, an example in which a facility is checked by using an image of an image-capturing apparatus 20 mounted on a drone, a robot that autonomously moves on the ground, or the like will be described. In this case, a video image of the image-capturing apparatus 20 may be distributed from the image-capturing apparatus 20 mounted on the drone or the like to the information processing apparatus 10.

First, when an area of an object to be checked (e.g., a steel tower, an electric wire, or the like) is detected based on the image of the image-capturing apparatus 20, the specifying unit 12 of the information processing apparatus 10 may improve the image quality of the entire image in such a way that reliability of the detection of the area becomes equal to or larger than a threshold based on the image-capture situation when the image is captured by the image-capturing apparatus 20. Further, when a part to be checked (e.g., an insulator) is tested (e.g., measurement of a damage or a degradation level) based on the image of the image-capturing apparatus 20, the specifying unit 12 of the information processing apparatus 10 may improve the image quality of the area of the part to be checked in such a way that the reliability of the testing becomes equal to or larger than a threshold based on the image-capture situation when the image is captured by the image-capturing apparatus 20.

Third Example Embodiment

Figure 10:
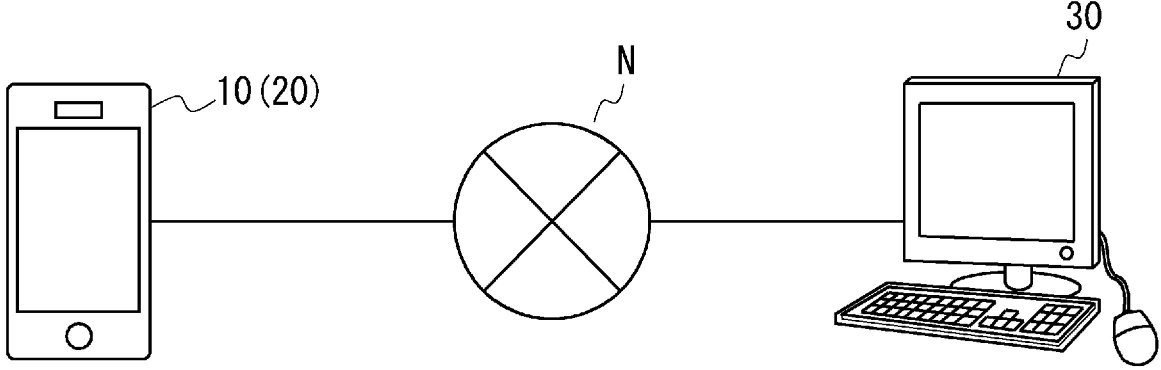
FIG. 10 is a diagram showing a configuration example of the information processing system according to the example embodiment.
Figure 11:
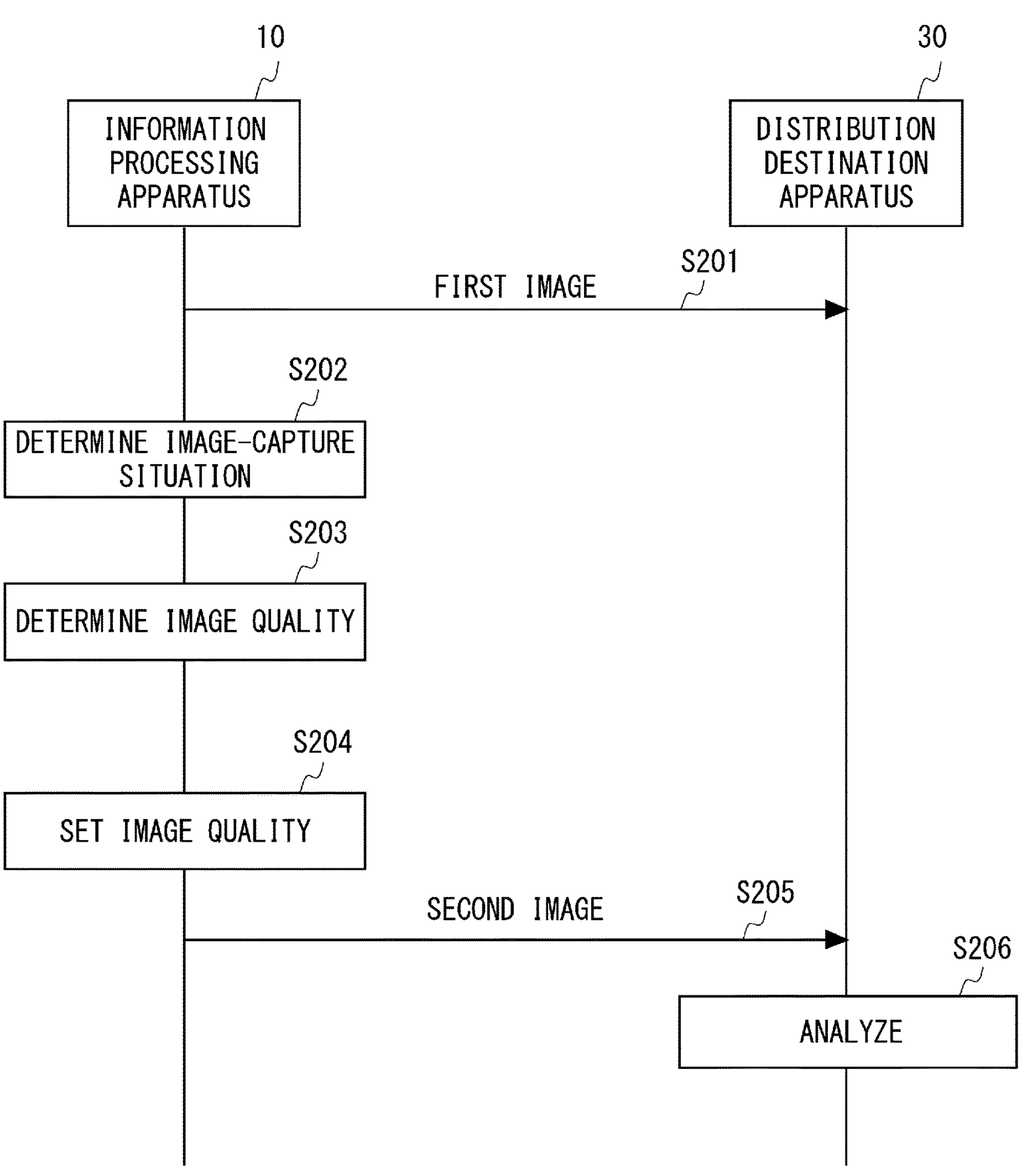
FIG. 11 is a sequence diagram showing one example of the processes of the information processing system according to the example embodiment.

In the examples shown in FIGS. 4 and 5, the example in which the image quality of a specific part or the like is determined in the information processing apparatus 10 to which an image is distributed has been described. In the following description, an example in which the image quality of a specific part or the like is determined in the information processing apparatus 10 which distributes an image will be described by referring to FIGS. 10 and 11. FIG. 10 is a diagram showing a configuration example of an information processing system 1 according to this example embodiment. FIG. 11 is a sequence diagram showing one example of processes in the information processing system 1 according to the example embodiment. In the example shown in FIG. 10, the information processing apparatus 10 including an image-capturing apparatus 20, and a distribution destination apparatus 30 are connected to each other in such a way that the information processing apparatus 10 and the distribution destination apparatus 30 can communicate with each other via a network N.

In Step S201, a control unit 13 of the information processing apparatus 10 distributes (transmits) a first image in which an area of a specific part of a subject in an image captured by the image-capturing apparatus 20 is coded to the distribution destination apparatus 30 via the network N. Next, the specifying unit 12 of the information processing apparatus 10 specifies an image-capture situation when the first image is captured by the image-capturing apparatus 20 based on the coded first image and the like (Step S202). Next, the specifying unit 12 of the information processing apparatus 10 determines a first image quality of the area of the specific part in accordance with the image-capture situation and an analysis target analyzed based on the area of the specific part of the subject (Step S203).

Next, the control unit 13 of the information processing apparatus 10 sets (changes) the image quality of the area of the specific part of the subject in the image captured by the image-capturing apparatus 20 to the first image quality (Step S204). Next, the control unit 13 of the information processing apparatus distributes (transmits) a second image in which the area of the specific part of the subject in the captured image is coded with the first image quality to the distribution destination apparatus 30 via the network N (Step S205). Next, the distribution destination apparatus 30 analyzes the subject based on the area of the specific part of the subject of the first image quality in the received second image (Step S206).

Note that the processes in Steps S201, S204, and S205 may be respectively similar to the processes in Steps S201, S105, and S106 in FIG. 5. Further, the processes in Steps S202, S203, and S206 may be respectively similar to the processes in Steps S102, S103, and S107 in the information processing apparatus 10B in FIG. 5. Note that analysis processing similar to the processes in Steps S202 and S206 may be executed in parallel in the information processing apparatus 10B as well.

MODIFIED EXAMPLES

While the information processing apparatus 10 may be an apparatus included in one housing, the information processing apparatus 10 according to the present disclosure is not limited to this example. Each unit of the information processing apparatus 10 may be implemented, for example, by cloud computing constituted by one or more computers. Further, at least some of the processes of the information processing apparatus 10 may be implemented, for example, by another information processing apparatus 10. Such an information processing apparatus 10 is also included in one example of the "information processing apparatus" according to the present disclosure.

Note that the present disclosure is not limited to the aforementioned example embodiments and may be changed as appropriate without departing from the spirit of the present disclosure.

The whole or part of the example embodiments disclosed above can be described as, but not limited to, the following supplementary notes.

Supplementary Note 1

An information processing system comprising:

specifying means for specifying, in accordance with an image-capture situation when an image is captured by an image-capturing apparatus and an item of analysis with regard to the image distributed via a network, a first image quality of an area of a specific part in the image used for the analysis; and control means for performing control for distributing the image by setting the image quality of the area of the specific part in the image to the first image quality.

Supplementary Note 2

The information processing system according to Supplementary Note 1, wherein the image-capture situation includes at least one of a state of a subject when the subject is photographed or a situation near the subject.

Supplementary Note 3

The information processing system according to Supplementary Note 1 or 2, wherein the specifying means further specifies the first image quality according to a communication environment of the network in which the image is distributed.

Supplementary Note 4

The information processing system according to any one of Supplementary Notes 1 to 3, wherein the specifying means specifies at least one of a bit rate of coding, a frame rate of coding, a quantization parameter of coding, a bit rate setting of an area in each layer of hierarchical coding, or a setting of the image-capturing apparatus as the first image quality.

Supplementary Note 5

The information processing system according to any one of Supplementary Notes 1 to 4, wherein information indicating a state of a living body, which is a subject of the image, is analyzed based on the area of the specific part in the image.

Supplementary Note 6

The information processing system according to any one of Supplementary Notes 1 to 5, wherein the specifying means specifies the first image quality using results of learning based on a data set of the image-capture situation, the item, the image quality of the area of the specific part, and reliability of analysis.

Supplementary Note 7

The information processing system according to any one of Supplementary Notes 1 to 6, wherein the specifying means determines that the image quality of the area of the specific part to be the first image quality and specifies the image quality of an area other than the specific part to be a second image quality lower than the first image quality, and the control means performs control for distributing an image in which the image quality of the area of the specific part is the first image quality and the image quality of the area other than the specific part is the second image quality.

Supplementary Note 8

An information processing method executing:

processing for specifying, in accordance with an image-capture situation when an image is captured by an image-capturing apparatus and an item of analysis with regard to the image distributed via a network, a first image quality of an area of a specific part in the image used for the analysis; and processing for performing control for distributing the image by setting the image quality of the area of the specific part in the image to the first image quality.

Supplementary Note 9

The information processing method according to Supplementary Note 8, wherein the image-capture situation includes at least one of a state of a subject when the subject is photographed or a situation near the subject.

Supplementary Note 10

The information processing method according to Supplementary Note 8 or 9, wherein, in the specifying processing, the first image quality is further specified according to a communication environment of the network in which the image is distributed.

Supplementary Note 11

The information processing method according to any one of Supplementary Notes 8 to 10, wherein, in the specifying processing, at least one of a bit rate of coding, a frame rate of coding, a quantization parameter of coding, a bit rate setting of an area in each layer of hierarchical coding, or a setting of the image-capturing apparatus is specified as the first image quality.

Supplementary Note 12

The information processing method according to any one of Supplementary Notes 8 to 11, wherein information indicating a state of a living body, which is a subject of the image, is analyzed based on the area of the specific part in the image.

Supplementary Note 13

The information processing method according to any one of Supplementary Notes 8 to 12, wherein, in the specifying processing, the first image quality is specified using results of learning based on a data set of the image-capture situation, the item, the image quality of the area of the specific part, and reliability of analysis.

Supplementary Note 14

The information processing method according to any one of Supplementary Notes 8 to 13, wherein, in the specifying processing, the image quality of the area of the specific part is determined to be the first image quality and the image quality of an area other than the specific part is specified to be a second image quality lower than the first image quality, and in the controlling processing, control for distributing an image in which the image quality of the area of the specific part is the first image quality and the image quality of the area other than the specific part is the second image quality is performed.

Supplementary Note 15

An information processing apparatus comprising:

specifying means for specifying, in accordance with an image-capture situation when an image is captured by an image-capturing apparatus and an item of analysis with regard to the image distributed via a network, a first image quality of an area of a specific part in the image used for the analysis; and control means for performing control for distributing the image by setting the image quality of the area of the specific part in the image to the first image quality.

Supplementary Note 16

The information processing apparatus according to Supplementary Note 15, wherein the image-capture situation includes at least one of a state of a subject when the subject is photographed or a situation near the subject.

Supplementary Note 17

The information processing apparatus according to Supplementary Note 15 or 16, wherein the specifying means further specifies the first image quality according to a communication environment of the network in which the image is distributed.

Supplementary Note 18

The information processing apparatus according to any one of Supplementary Notes 15 to 17, wherein the specifying means specifies at least one of a bit rate of coding, a frame rate of coding, a quantization parameter of coding, a bit rate setting of an area in each layer of hierarchical coding, or a setting of the image-capturing apparatus as the first image quality.

Supplementary Note 19

The information processing apparatus according to any one of Supplementary Notes 15 to 18, wherein information indicating a state of a living body, which is a subject of the image, is analyzed based on the area of the specific part in the image.

Supplementary Note 20

The information processing apparatus according to any one of Supplementary Notes 15 to 19, wherein the specifying means specifies the first image quality using results of learning based on a data set of the image-capture situation, the item, the image quality of the area of the specific part, and reliability of analysis.

Supplementary Note 21

The information processing apparatus according to any one of Supplementary Notes 15 to 20, wherein the specifying means determines that the image quality of the area of the specific part to be the first image quality and specifies the image quality of an area other than the specific part to be a second image quality lower than the first image quality, and the control means performs control for distributing an image in which the image quality of the area of the specific part is the first image quality and the image quality of the area other than the specific part is the second image quality.

REFERENCE SIGNS LIST

1 INFORMATION PROCESSING SYSTEM
10 INFORMATION PROCESSING APPARATUS
10A INFORMATION PROCESSING APPARATUS
10 INFORMATION PROCESSING APPARATUS
12 SPECIFYING UNIT
13 CONTROL UNIT
20 IMAGE-CAPTURING APPARATUS
30 DISTRIBUTION DESTINATION APPARATUS
N NETWORK

What is claimed is:

1. An information processing system comprising:

at least one memory storing instructions, and at least one processor configured to execute the instructions to;

specify, in accordance with an image-capture situation when an image is captured by an image-capturing apparatus and an item of analysis with regard to the image distributed via a network, a first image quality of an area of a specific part in the image used for the analysis; and perform control for distributing the image by setting the image quality of the area of the specific part in the image to the first image quality, wherein the at least one processor is further configured to execute the instructions to:

estimate, based on the image-capture situation and the item of analysis, a reliability of the analysis corresponding to one or more image qualities of the area of the specific part, and specify, based on a communication amount when the image is distributed with each of the one or more image qualities and the reliability, the first image quality from among the one or more image qualities.

2. The information processing system according to claim 1, wherein the image-capture situation includes at least one of a state of a subject when the subject is photographed or a situation near the subject.

3. The information processing system according to claim 1, wherein the at least one processor is further configured to specify the first image quality according to a communication environment of the network in which the image is distributed.

4. The information processing system according to claim 1, wherein the at least one processor is configured to specify at least one of a bit rate of coding, a frame rate of coding, a quantization parameter of coding, a bit rate setting of an area in each layer of hierarchical coding, or a setting of the image-capturing apparatus as the first image quality.

5. The information processing system according to claim 1, wherein information indicating a state of a living body, which is a subject of the image, is analyzed based on the area of the specific part in the image.

6. The information processing system according to claim 1, wherein the at least one processor is configured to determine that the image quality of the area of the specific part to be the first image quality and specifies the image quality of an area other than the specific part to be a second image quality lower than the first image quality, and the at least one processor is configured to perform control for distributing an image in which the image quality of the area of the specific part is the first image quality and the image quality of the area other than the specific part is the second image quality.

7. An information processing method executing:

processing for specifying, in accordance with an image-capture situation when an image is captured by an image-capturing apparatus and an item of analysis with regard to the image distributed via a network, a first image quality of an area of a specific part in the image used for the analysis; and processing for performing control for distributing the image by setting the image quality of the area of the specific part in the image to the first image quality, wherein the processing for specifying comprises:

estimating, based on the image-capture situation and the item of analysis, a reliability of the analysis corresponding to one or more image qualities of the area of the specific part, and specifying, based on a communication amount when the image is distributed with each of the one or more image qualities and the reliability, the first image quality from among the one or more image qualities.

8. The information processing method according to claim 7, wherein the image-capture situation includes at least one of a state of a subject when the subject is photographed or a situation near the subject.

9. The information processing method according to claim 7, wherein, in the specifying processing, the first image quality is further specified according to a communication environment of the network in which the image is distributed.

10. The information processing method according to claim 7, wherein, in the specifying processing, at least one of a bit rate of coding, a frame rate of coding, a quantization parameter of coding, a bit rate setting of an area in each layer of hierarchical coding, or a setting of the image-capturing apparatus is specified as the first image quality.

11. The information processing method according to claim 7, wherein information indicating a state of a living body, which is a subject of the image, is analyzed based on the area of the specific part in the image.

12. The information processing method according to claim 7, wherein, in the specifying processing, the image quality of the area of the specific part is determined to be the first image quality and the image quality of an area other than the specific part is specified to be a second image quality lower than the first image quality, and in the controlling processing, control for distributing an image in which the image quality of the area of the specific part is the first image quality and the image quality of the area other than the specific part is the second image quality is performed.

13. An information processing apparatus comprising:

at least one memory storing instructions, and at least one processor configured to execute the instructions to;

specify, in accordance with an image-capture situation when an image is captured by an image-capturing apparatus and an item of analysis with regard to the image distributed via a network, a first image quality of an area of a specific part in the image used for the analysis; and perform control for distributing the image by setting the image quality of the area of the specific part in the image to the first image quality, wherein the at least one processor is further configured to execute the instructions to:

estimate, based on the image-capture situation and the item of analysis, a reliability of the analysis corresponding to one or more image qualities of the area of the specific part, and specify, based on a communication amount when the image is distributed with each of the one or more image qualities and the reliability, the first image quality from among the one or more image qualities.

14. The information processing apparatus according to claim 13, wherein the image-capture situation includes at least one of a state of a subject when the subject is photographed or a situation near the subject.

15. The information processing apparatus according to claim 13, wherein the at least one processor is further configured to specify the first image quality according to a communication environment of the network in which the image is distributed.

16. The information processing apparatus according to claim 13, wherein the at least one processor is configured to specify at least one of a bit rate of coding, a frame rate of coding, a quantization parameter of coding, a bit rate setting of an area in each layer of hierarchical coding, or a setting of the image-capturing apparatus as the first image quality.

17. The information processing apparatus according to claim 13, wherein information indicating a state of a living body, which is a subject of the image, is analyzed based on the area of the specific part in the image.

18. The information processing system according to claim 1, wherein the at least one processor is further configured to execute the instructions to:

set, for each of the one or more image qualities, a priority determined to be higher as the communication amount decreases and the reliability of the analysis increases, and specify the image quality whose priority is the highest among the one or more image qualities as the first image quality.

19. The information processing method according to claim 7, wherein the processing for specifying further comprises:

setting, for each of the one or more image qualities, a priority determined to be higher as the communication amount decreases and the reliability of the analysis increases, and specifying the image quality whose priority is the highest among the one or more image qualities as the first image quality.

20. The information processing apparatus according to claim 13, wherein the at least one processor is further configured to execute the instructions to:

set, for each of the one or more image qualities, a priority determined to be higher as the communication amount decreases and the reliability of the analysis increases, and specify the image quality whose priority is the highest among the one or more image qualities as the first image quality.

* * * * *